(12) United States Patent
Barker et al.

(10) Patent No.: US 10,820,585 B2
(45) Date of Patent: Nov. 3, 2020

(54) SPRAYER SYSTEMS WITH RETRACTABLE DROP APPARATUSES

(71) Applicant: Deere & Company, Moline, IL (US)

(72) Inventors: Mark E. Barker, Johnston, IA (US); Richard A. Humpal, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/703,797

(22) Filed: Sep. 13, 2017

(65) Prior Publication Data

US 2019/0075778 A1    Mar. 14, 2019

(51) Int. Cl.
*A01M 7/00*       (2006.01)
*A01B 63/10*     (2006.01)
*B05B 1/02*       (2006.01)
*B66F 7/06*       (2006.01)

(52) U.S. Cl.
CPC .......... *A01M 7/0057* (2013.01); *A01M 7/006* (2013.01); *A01M 7/0042* (2013.01); *A01B 63/10* (2013.01); *A01M 7/0064* (2013.01); *A01M 7/0075* (2013.01); *B66F 7/0666* (2013.01)

(58) Field of Classification Search
CPC .............. A01M 7/0053; A01M 7/0057; A01M 7/0042; A01M 7/0064; A01M 7/0075; A01M 7/0082; A01M 7/006; B05B 15/70; B05B 15/72; B05B 15/68; A01G 25/09; B66C 17/00; B66C 17/06; B66C 19/00; B66F 7/065; B66F 7/0658; B66F 7/0666; B66F 7/0675; B66F 7/0683; B66F 9/07

USPC ....... 239/164, 165, 169, 175, 159, 195–198, 239/210
See application file for complete search history.

(56) References Cited

U.S. PATENT DOCUMENTS 1,003,967 A * 9/1911 Magliocca ............. A62C 31/24
                                                                 182/51
1,583,619 A   5/1926 Splittstoser
(Continued)

FOREIGN PATENT DOCUMENTS

CN      105613462 A     6/2016
CN      205389739 U     7/2016
(Continued)

OTHER PUBLICATIONS

360 Yield Center, 360 Y-Drop Website: https://www.360yieldcenter.com/products/360-y-drop/, Copyright 2017.
(Continued)

*Primary Examiner* — Joseph A Greenlund
(74) *Attorney, Agent, or Firm* — Klintworth & Rozenblat IP LLP

(57) ABSTRACT

The sprayer system associated with a work vehicle having a boom and a fluid source may include a spray device configured to selectively apply a fluid from the fluid source on the work vehicle to an agricultural crop. The sprayer system may further include a drop apparatus having a linkage assembly with a top portion coupled to the boom and a bottom portion coupled to the spray device. The linkage assembly may be selectively repositionable between a retracted position and an extended position to raise and lower the spray device relative to the boom along an upright reference axis.

20 Claims, 9 Drawing Sheets

(56) References Cited

U.S. PATENT DOCUMENTS

Figure 1:
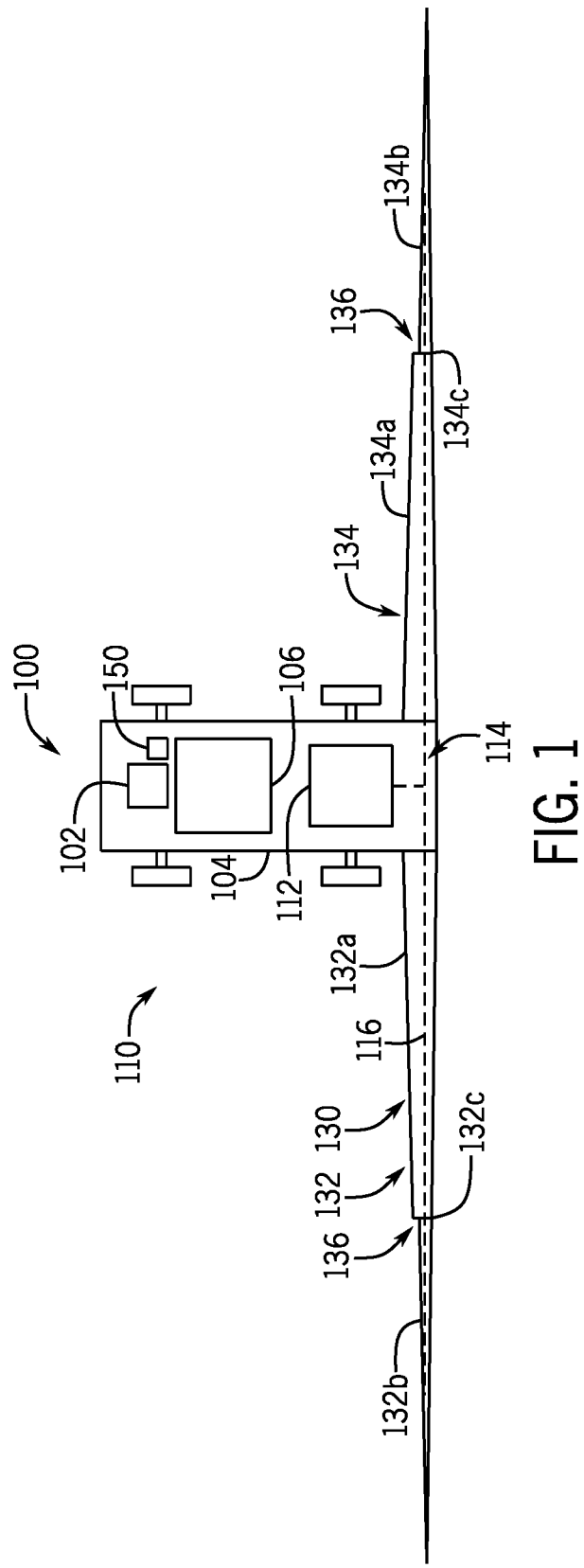

| | | | | |
|---|---|---|---|---|
| 1,887,092 | A | * | 11/1932 | Glase .................... A01M 7/005 239/168 |
| 2,301,213 | A | * | 11/1942 | Kang .................... A01M 7/005 47/1.7 |
| 3,147,568 | A | * | 9/1964 | Inhofer ............... A01M 7/0064 47/1.7 |
| 3,927,832 | A | * | 12/1975 | Robison ............. A01M 7/0075 239/168 |
| 4,391,297 | A | * | 7/1983 | Knight .................... E21B 43/26 137/615 |
| 4,502,505 | A | * | 3/1985 | Moller .................... E21B 43/26 137/615 |
| 4,521,988 | A | * | 6/1985 | Thacker ............... A01M 7/0064 47/1.7 |
| 4,677,787 | A | * | 7/1987 | Said .................... A01M 7/0053 172/687 |
| 4,736,888 | A | * | 4/1988 | Fasnacht ............... A01M 7/005 239/161 |
| 4,828,043 | A | * | 5/1989 | Karlsson .................. A01B 3/38 172/656 |
| 4,947,581 | A | * | 8/1990 | Claussen ............. A01M 7/0064 239/175 |
| 5,012,608 | A | * | 5/1991 | Brown ................ A01M 7/0075 239/159 |
| 5,155,933 | A | * | 10/1992 | Claussen ............. A01M 7/0064 239/175 |
| 5,248,090 | A | * | 9/1993 | Williamson ............ B05B 12/36 239/168 |
| 5,326,030 | A | | 7/1994 | Benest |
| 5,394,959 | A | * | 3/1995 | Cullity .................... B66B 9/16 180/414 |
| 5,454,136 | A | * | 10/1995 | Gougoulas ................ B60S 3/002 15/312.1 |
| 5,516,044 | A | * | 5/1996 | Thorstensson ...... A01M 7/0042 239/159 |
| 5,613,635 | A | * | 3/1997 | Harden ................ A01M 7/005 239/166 |
| 5,746,396 | A | * | 5/1998 | Thorton-Trump ........ B64F 5/20 169/24 |
| 6,192,905 | B1 | * | 2/2001 | Mincy .................... B08B 9/093 134/167 R |
| 7,063,273 | B2 | * | 6/2006 | Hahn .................. A01M 7/0064 239/159 |
| 7,077,070 | B1 | | 7/2006 | Williams |
| 9,402,355 | B2 | * | 8/2016 | Qin ........................ A01G 25/09 |
| 2006/0011741 | A1 | * | 1/2006 | Hahn .................. A01M 7/0064 239/172 |
| 2007/0141248 | A1 | * | 6/2007 | Dolin .................... E04F 21/085 427/181 |
| 2011/0132993 | A1 | * | 6/2011 | Wiseman ................ B05B 15/00 239/17 |
| 2013/0043326 | A1 | * | 2/2013 | Muff .................... A01C 23/047 239/159 |
| 2013/0119153 | A1 | * | 5/2013 | Hoeben .................. B05B 15/16 239/288.3 |
| 2016/0008936 | A1 | * | 1/2016 | McIntosh ................ B23Q 3/062 269/54.1 |
| 2016/0009325 | A1 | * | 1/2016 | Perkins ................. B66C 1/0256 212/171 |
| 2016/0121355 | A1 | * | 5/2016 | Claussen ................ B05B 15/65 239/164 |
| 2016/0121486 | A1 | * | 5/2016 | Lipinski ............. B05B 13/0431 427/427.3 |
| 2016/0297643 | A1 | * | 10/2016 | Lowe ...................... F15B 15/26 |
| 2018/0242517 | A1 | * | 8/2018 | Davis .................... A01C 7/201 |
| 2018/0243771 | A1 | * | 8/2018 | Davis .................... A01M 7/0014 |
| 2018/0243772 | A1 | * | 8/2018 | Davis .................... A01M 7/0053 |
| 2018/0243773 | A1 | * | 8/2018 | Davis .................... A01C 23/007 |
| 2018/0243774 | A1 | * | 8/2018 | Davis .................... A01B 69/001 |
| 2019/0075778 | A1 | * | 3/2019 | Barker ................ A01M 7/0042 |
| 2019/0104720 | A1 | * | 4/2019 | Sullivan ................ A01M 7/006 |

FOREIGN PATENT DOCUMENTS

| | | |
|---|---|---|
| EP | 0600919 A1 | 6/1994 |
| EP | 3366134 A1 | 8/2018 |
| FR | 1574708 A | 7/1969 |
| FR | 2254176 A5 | 7/1975 |
| FR | 2692429 A1 | 12/1993 |
| KR | 20110007506 A | 1/2011 |

OTHER PUBLICATIONS

European extended search report for application No. 18193456.3 dated Feb. 15, 2019.

European Office Action issued in counterpart European Patent Application No. 18193456.3 dated Feb. 13, 2020 (8 pages).

* cited by examiner

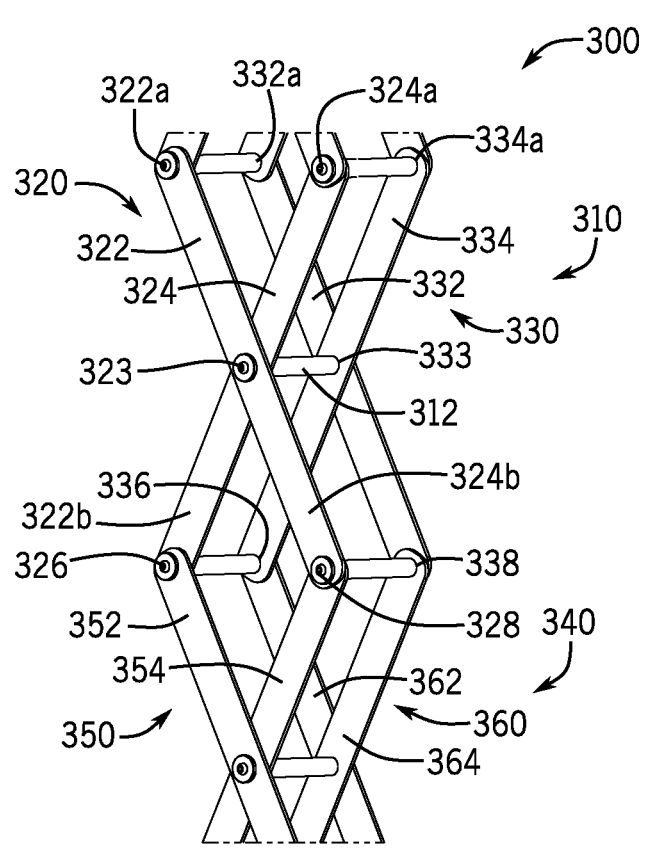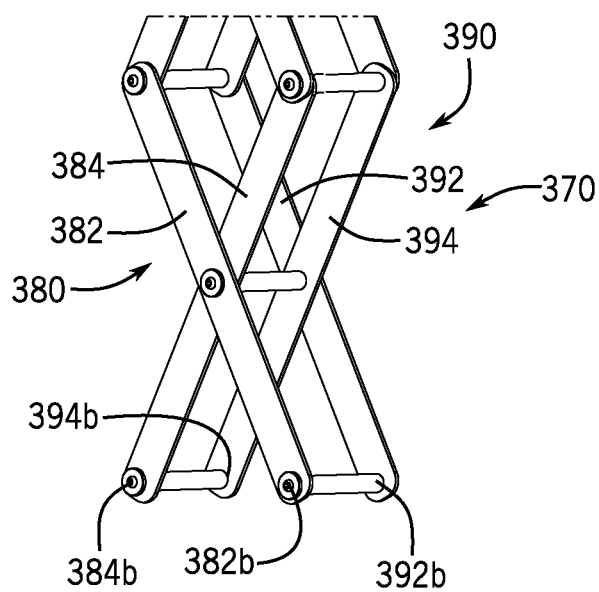
FIG. 6

SPRAYER SYSTEMS WITH RETRACTABLE DROP APPARATUSES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to fluid sprayer systems such as those used in agriculture, manufacturing, and industrial applications.

BACKGROUND OF THE DISCLOSURE

Large sprayer systems apply nutrients, herbicides, paints, chemicals and other liquids such as those used in the agriculture or manufacturing industries. These systems tend to have large physical structures, particularly boom assemblies that extend outwardly perpendicular to the direction of travel and support fluid distribution pipes and spray devices for the distribution of liquid across a wide geographical area. In some applications, the spray devices are mounted on drop apparatuses along the underside of the boom assemblies that position the spray devices closer to the ground. However, the size of the boom assemblies and associated components may present challenges when transporting or maneuvering the sprayer systems.

SUMMARY OF THE DISCLOSURE

The disclosure provides a system and method for applying fluids, such as those used in agriculture, manufacturing, and industrial applications In one aspect, the sprayer system is associated with a work vehicle with a boom and a fluid source. The sprayer system may include a spray device configured to selectively apply a fluid from the fluid source on the work vehicle to an agricultural crop. The sprayer system may further include a drop apparatus having a linkage assembly with a top portion coupled to the boom and a bottom portion coupled to the spray device. The linkage assembly may be selectively repositionable between a retracted position and an extended position to raise and lower the spray device relative to the boom along an upright reference axis.

In another aspect, an agricultural work machine may include a chassis; an engine mounted on the chassis for propelling the work machine; a boom extending from at least one side of the chassis; and a sprayer system. The sprayer system may include a tank coupled to the chassis; at least one spray device arranged to selectively apply a fluid from the tank to an agricultural crop; and at least one drop apparatus configured to mount the at least one spray device to the boom. The at least one drop apparatus may include a linkage assembly being selectively repositionable between a retracted position and an extended position to raise and lower the at least one spray device relative to the boom along an upright reference axis.

The details of one or more embodiments are set forth in the accompanying drawings and the description below. Other features and advantages will become apparent from the description, the drawings, and the claims.

BRIEF DESCRIPTION OF THE DRAWINGS

FIG. 1 is a top plan view of an example sprayer system in the form of a vehicle work machine in which retractable drop apparatuses according to this disclosure may be implemented;

FIG. 2 is a partial rear isometric view of a boom of the work machine of FIG. 1;

FIG. 3 is a closer front isometric view of a drop apparatus mounting a spray device to the boom of the work machine of FIG. 1 in a retracted position;

FIGS. 4 and 5 are front isometric views of the drop apparatus of FIG. 3 in extended positions;

FIG. 6 is a schematic view of an example linkage assembly of the drop apparatus of FIG. 3;

FIGS. 7 and 8 are partial top isometric views of the drop apparatus of FIG. 3;

FIG. 9 is a cross-sectional view of the drop apparatus of FIG. 3;

FIG. 10 is a partial bottom isometric view of the drop apparatus of FIG. 3;

FIG. 11 is a partial top view of the boom of FIG. 2; and

FIGS. 12 and 13 are partial side and isometric views of the boom of FIG. 2.

Like reference symbols in the various drawings indicate like elements.

DETAILED DESCRIPTION

The following describes one or more example embodiments of the disclosed sprayer systems and methods, as shown in the accompanying figures of the drawings described briefly above. Various examples herein refer to the context of a sprayer system for crops. It will be understood, however, that the disclosed sprayer system may be utilized in a variety of settings. It will also be understood that, while terms such as "top," "bottom," "upper," "lower," "clockwise," "counterclockwise" and the like may be utilized below with respect to an orientation or operation depicted in a particular figure, such terms may be used in a relative sense and are not intended to limit the disclosure to the particular orientation or operation described. Various modifications to the example embodiments may be contemplated by one of skill in the art.

FIG. 1 depicts an example work machine (or vehicle) 100 into which a sprayer system 110 is integrated. Generally, the work machine 100 is a self-propelled agricultural sprayer with an engine 102 that powers a propulsion system (e.g., a drive train, transmission, wheels, etc.) to propel and navigate the work machine 100 into appropriate positions and locations for application of fluid (e.g., chemical solutions, water, etc.) by the sprayer system 110. The work machine 100 may have a chassis 104 to support the engine 102 and other aspects of the machine 100, including an operator cabin 106, a supply tank 112 of the sprayer system 110, and a boom assembly 130. Other systems may include transmission, brake and steering assemblies, human-machine interfaces, and machine communication components. Although not shown or discussed further in detail, the work machine 100 may include various machine or vehicle components appropriate for the relevant industry. Various sensors may also be provided to observe various conditions associated with the work machine 100, particularly one or more location sensors, such as GPS receivers or inertial measurement units, that provide signals to the controller 150 to ascertain the location and position of the work machine 100. Although depicted as a self-propelled vehicle, in some embodiments, the sprayer system 110 may be embodied as a towed system, e.g., by a separable tractor or truck.

As introduced above, the work machine 100 includes a boom assembly 130 to facilitate application of the fluids by the sprayer system 110. For example, the boom assembly 130 functions to support aspects of the sprayer system 110 in applying fluids in the desired target area. As described in greater detail below, the boom assembly 130 may support an array of spray devices at predetermined intervals to apply fluids across multiple rows of agricultural products at a time.

The boom assembly 130 may be a generally rigid framework of tubular or solid frame structures. For example, the boom assembly 130 may have upper and lower carriers interconnected with numerous struts forming a trussed arrangement. As presented in the example below, the boom assembly 130 may include several booms, and each boom may have several sections, such as of decreasing size moving outward, that are coupled together to extend in total to lengths of near or over 100 feet.

As shown, the boom assembly 130 is mounted on the back of the machine 100 and may include a left boom (or wing) 132 and a right boom (or wing) 134 extending from a respective side of a center rack of the vehicle. The left boom 132 and right boom 134 of the boom assembly 130 may each have a plurality (e.g., two, three, or more) of sections, although in some examples, the boom may have only a single section. In the depicted example, each boom 132, 134 of the boom assembly 130 may include an inner section 132*a*, 134*a* mounted on the chassis 104 and an outer section 132*b*, 134*b* mounted to the inner section 132*a*, 134*a*.

In an operating position such as that shown in FIG. 1, the boom assembly 130 may have a relatively wide wingspan or footprint that may be challenging with respect to maneuvering, transport, and/or storage. As such, the boom assembly 130 may include folding arrangements 136 that function to facilitate the folding of the booms 132, 134 in a generally horizontal plane. In one embodiment, the booms 132, 134 may be folded at hinges 132*c*, 134*c* between spray boom sections 132*a*, 132*b*; 134*a*, 134*b*, thereby resulting in a smaller overall wingspan. In other words, boom section 132*b* may be folded onto boom section 132*a* at hinge 132*c*, and boom section 134*b* may be folded onto boom section 134*a* at hinge 134*c*. Although not shown, the folding arrangements 136 may further include actuation devices (e.g., hydraulic actuators or motors) to facilitate folding. Additional details regarding the folding operation are provided below.

During typical operation, the sprayer system 110 may operate during an application cycle to direct the fluid from the supply tank 112, through a series of pipes, conduits, hoses, pumps, valves and/or the like (e.g., "plumbing" 114), and out of one or more spray devices. In one example, the plumbing 114 may include supply conduits 116 extending across the length of each boom 132, 134 and hoses that fluidly couple the supply conduit 116 to each spray device. Operation of the sprayer system 110 may be managed by a controller 150, automatically and/or in accordance with operator commands, as described in greater detail below.

As introduced above, operation of the machine 100 may be controlled by a control system with a controller 150, which may be configured as a computing device with associated processor devices and memory architectures, as a hard-wired computing circuit (or circuits), as a programmable circuit, as a hydraulic, electrical or electro-hydraulic controller, or otherwise. As such, the controller 150 may be configured to execute various computational and control functionality with respect to the work machine 100 and/or sprayer system 110, as well as the associated components discussed below. In some embodiments, the controller 150 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 150 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 150 may be in electronic, hydraulic, mechanical, or other communication with various other systems or devices, such as various actuators, sensors, and other devices within (or outside of) the work machine 100. The controller 150 may communicate with other systems or devices (including other controllers) in various known ways, including via a CAN bus (not shown), via wireless or hydraulic communication means, or otherwise. The controller 150 is typically arranged on the work machine 100, although other locations are possible including various remote locations.

In some embodiments, the controller 150 may be configured to receive input commands and to interface with an operator via a human-machine interface, which may be disposed inside a cab of the work machine 100 for easy access by the operator. The human-machine interface may be configured in a variety of ways, including an input device with one or more joysticks, various switches or levers, one or more buttons, a touchscreen interface that may be overlaid on a display, a keyboard, a speaker, a microphone associated with a speech recognition system, or various other human-machine interface devices. A display of the interface may be implemented as a flat panel display or other display type that is integrated with an instrument panel or console of the work machine 100.

The controller 150 may include and/or cooperate with a communication component, which may be any suitable system for receiving data from and transmitting data, such as a Bluetooth® transceiver, a satellite transceiver, a radio transceiver, a cellular transceiver, an LTE transceiver and/or a Wi-Fi transceiver. Further details regarding operation of the controller 150 will be provided below.

Accordingly, during operation in one embodiment, the controller 150 may monitor a number of input parameters, including location signals, timing considerations, and/or environmental data. The controller 150 may also receive user input, e.g. from a user input device or communications system. In response, the controller 150 may send control signals to actuate various aspects of the sprayer system 110, work machine 100, and the components described in greater detail below, including the application of fluid through the sprayer system 110, as well as folding and unfolding the boom assembly 130 and/or retracting and extending the spray devices. In one embodiment, the controller 150 may store and implement preprogrammed instructions that automatically perform the functions described below, although other examples may utilize operator intervention.

Figure 2:
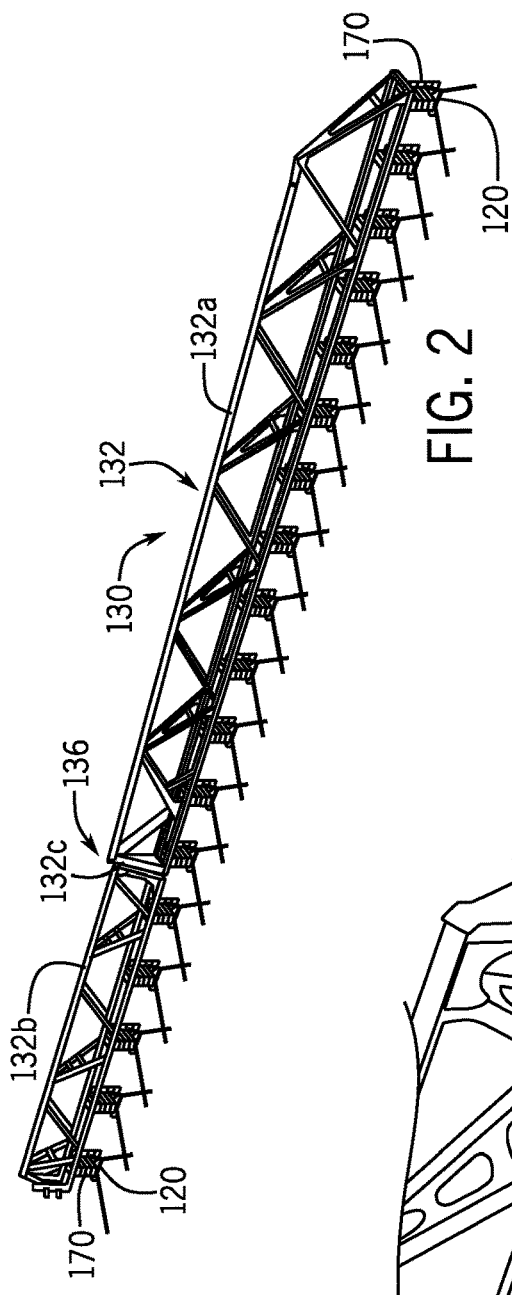

FIG. 2 is a partial isometric view of a boom 132 of the boom assembly 130 of FIG. 1. The boom 132 in FIG. 2 is the left boom, although the right boom 134 (FIG. 1) may have similar features.

As noted above and shown in FIG. 2, the sprayer system 110 includes an array of spray heads, referred to herein as spray devices 120, that receive fluid from the supply tank 112 via the plumbing 114 (FIG. 1) for application of the fluid to the environment proximate to the positions of the spray devices 120. Each of the spray devices 120 is mounted to the underside of the boom assembly 130 with a drop apparatus 170. As described in greater detail below, the drop apparatuses 170 are retractable and extendable to respectively raise and/or lower the spray devices 120 relative to the ground and boom assembly 130. As such, the drop apparatuses 170 may be raised into a retracted position for storage or maneuvering and/or lowered into an extended position for applying the fluid at a position near the ground. The orientation of movement of the drop apparatuses 170 and associated spray devices 120 is along a substantially upright reference axis or longitudinal axis. In most instances, the upright reference axis is generally vertical. In one embodiment, the drop apparatuses 170 may further cooperate with folding arrangements 136 to facilitate the folding of the boom assembly 130, thereby enabling more effective and efficient maneuvering, storage, and transport. Additional details about the drop apparatuses 170 will be provided below.

Figure 3:
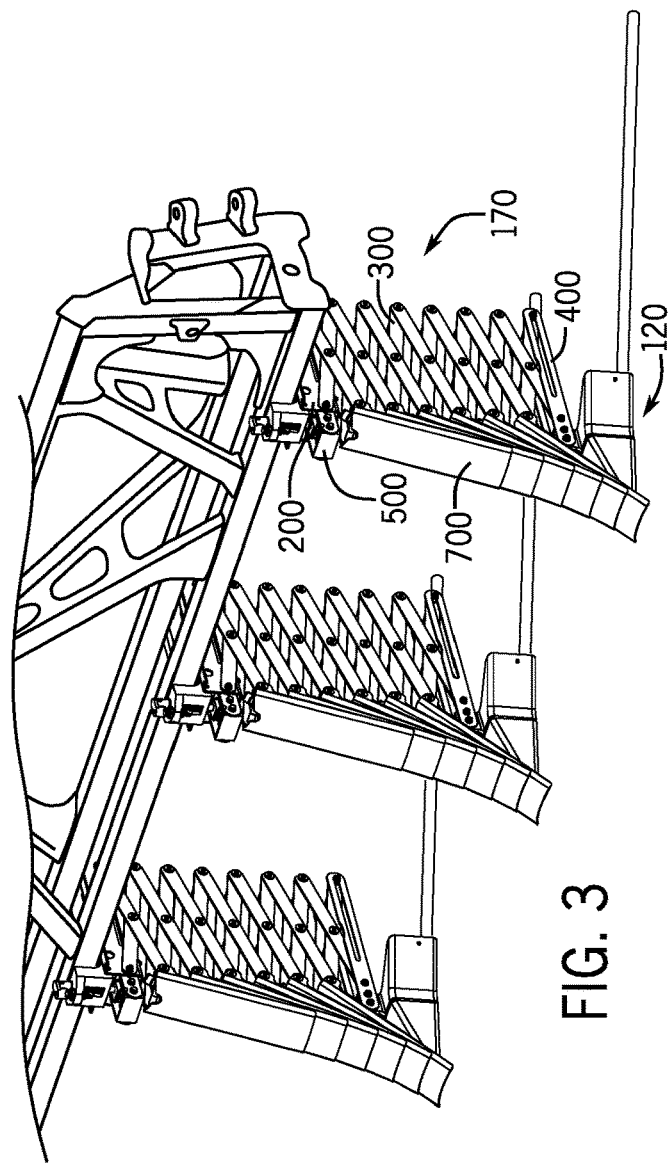
Figure 5:
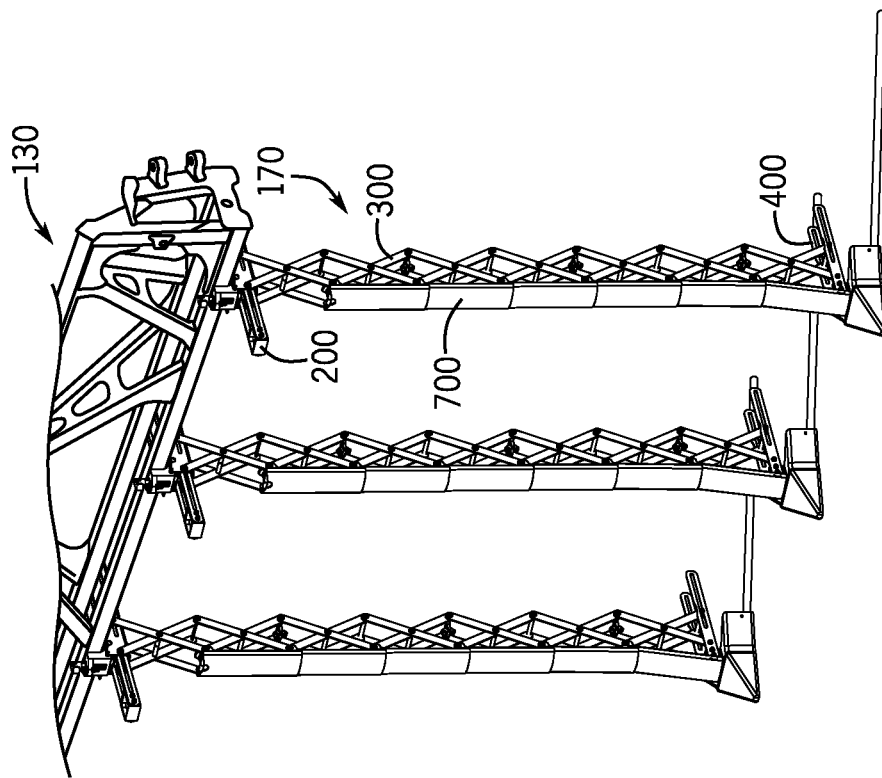
Figure 4:
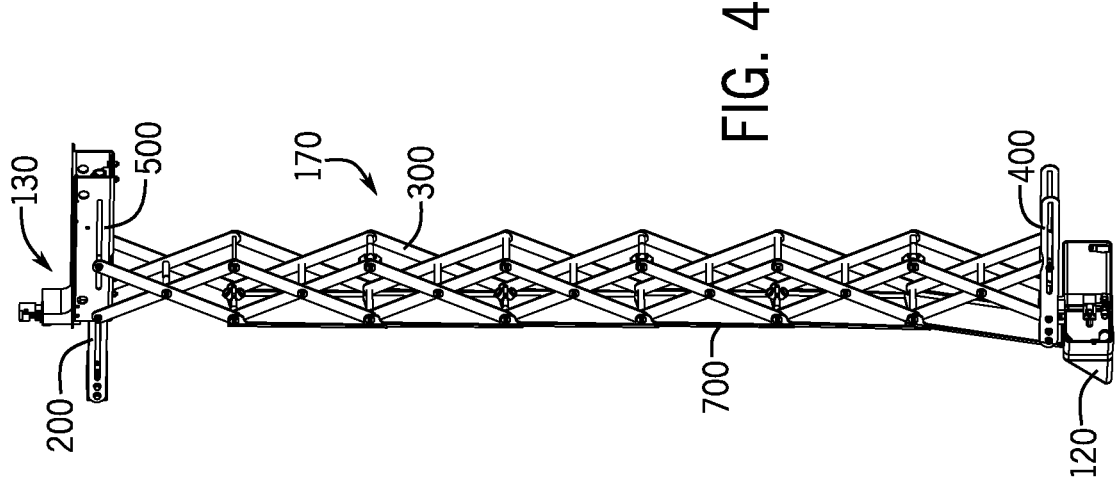

FIG. 3 is a closer front isometric view of the drop apparatus 170 mounting the spray device 120 to the boom assembly 130 in a retracted position. FIGS. 4 and 5 are front isometric views of the drop apparatuses 170 of FIG. 3 in extended positions.

Referring to FIGS. 3-5, the drop apparatus 170 may be considered to include a top bracket 200, a linkage assembly 300, a bottom bracket 400, an actuation device 500, and/or a shield arrangement 700. Generally, as described in greater detail below, the top bracket 200 is mounted to the boom assembly 130 and the bottom bracket 400 is mounted to the spray device 120. The linkage assembly 300 extends between the top bracket 200 and the bottom bracket 400 such that the spray device 120 is coupled to the boom assembly 130 with the drop apparatus 170. The actuation device 500 may be mounted on, or proximate to, the top bracket 200 and operates to extend and retract the linkage assembly 300 to vertically reposition the spray device 120, as described below.

In one embodiment, the linkage assembly 300 is a scissor linkage assembly formed by a number of interconnected pairs of scissor links. In one example, the interconnected pairs of scissor links may be considered a series of pair sets, e.g., double pairs of scissor links, referred to below as "left" and "right" pairs of scissor links arranged in a series extending generally parallel to each other along a upright, longitudinal, or vertical direction. Other arrangements may be provided, including a single series of pairs.

Reference is briefly made to FIG. 6, which is a schematic representation of the linkage assembly 300 of the drop apparatus 170. As shown, the linkage assembly 300 may include a number of linkage pair sets 310, 340, 370 that will be used to describe general operation of the linkage assembly 300. In this example, the linkage assembly 300 includes a top linkage pair set 310, one or more intermediate linkage pair sets 340, and a bottom linkage pair set 370. In practice, such as depicted in FIGS. 3-5 and represented in FIG. 6 by a broken line, the linkage assembly 300 will typically have a number of intermediate linkage pair sets 340. However, in other embodiments, the linkage assembly 300 may only have only one or two linkage pair sets, such that the intermediate linkage pair set(s) may be omitted and/or one of the top or bottom linkage pair sets may be omitted.

As shown in FIG. 6, each linkage pair set 310, 340, 370 is formed by a left linkage pair 320, 350, 380, each respectively formed by two scissor links 322, 324; 352, 354; 382, 384, and a right linkage pair 330, 360, 390, each respectively formed by two scissor links 332, 334; 362, 364; 392, 394.

Referring to the left linkage pair 320 of the top linkage pair set 310 as an example, each of the two scissor links 322, 324 has top and bottom ends 322a, 322b; 324a, 324b and are joined to one another at a center pivot connection 323 approximately midway between the ends 322a, 322b; 324a, 324b. The top ends 322a, 324a are pivotably attached to the top bracket 200, as described in greater detail below. The bottom ends 322b, 324b are pivotably attached to top ends of the scissor links 352, 354 of the left linkage pair 350 of the intermediate linkage pair set 340 at end point connections 326, 328.

The right linkage pair 330 of the top linkage pair set 310 is similarly arranged with two scissor links 332, 334 having top and bottom ends 332a, 332b; 334a, 334b and being joined to one another at a center pivot connection 333 approximately midway between the ends 332a, 332b; 334a, 334b. As above, the top ends 332a, 334a are pivotably attached to the top bracket 200, and the bottom ends 332b, 334b are pivotably attached to top ends of the scissor links 362, 364 of the right linkage pair 360 of the intermediate linkage pair set 340 at end pivot connections 336, 338.

The left linkage pair 320 of the top linkage pair set 310 is attached to the right linkage pair 330 of the of the top linkage pair set 310 with a pivot element 312 extending between the pivot connections 323, 333. The intermediate and bottom linkage pair sets 340, 370 have similar arrangements. With reference to the bottom linkage pair set 370, the bottom ends 382b, 384b; 392b, 394b of the two scissor links 382, 384; 392, 394 are pivotably coupled to the bottom bracket 400.

Figure 7:
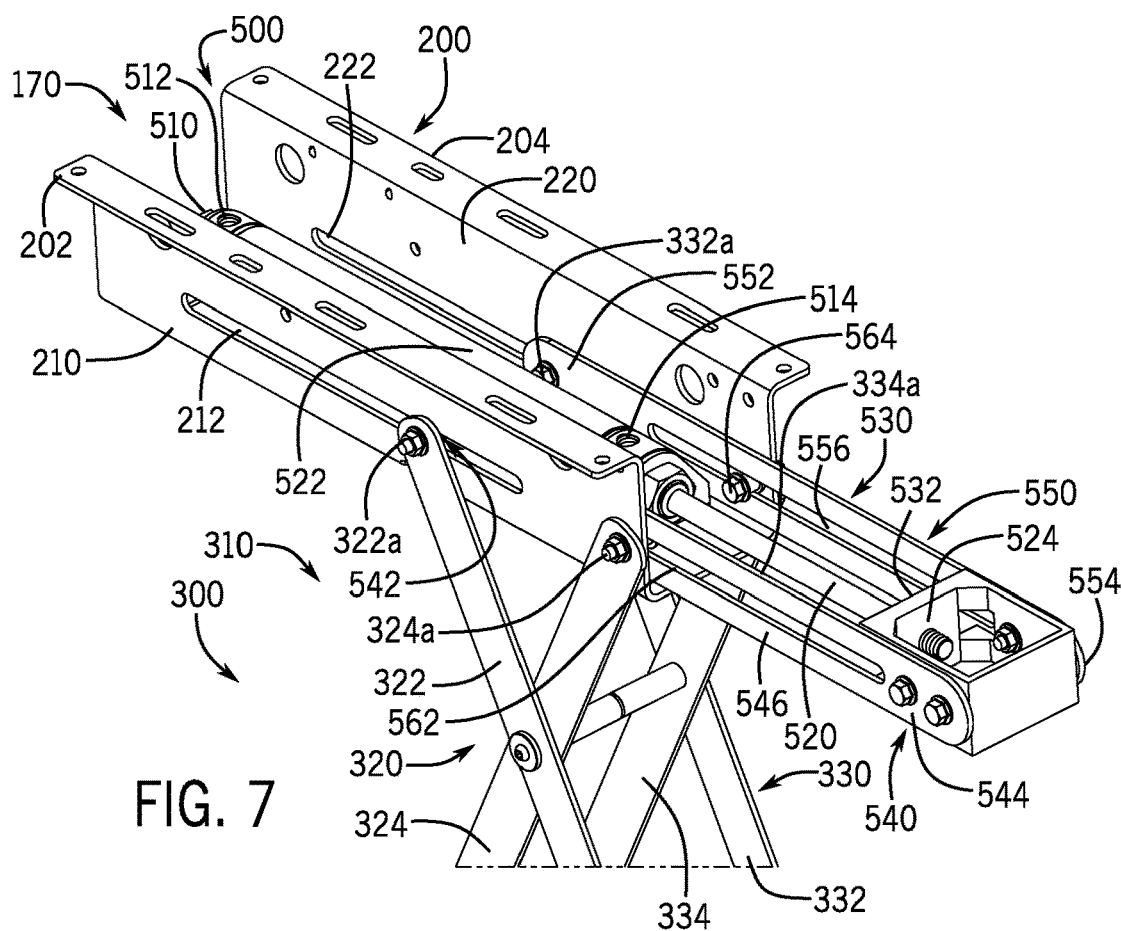
Figure 8:
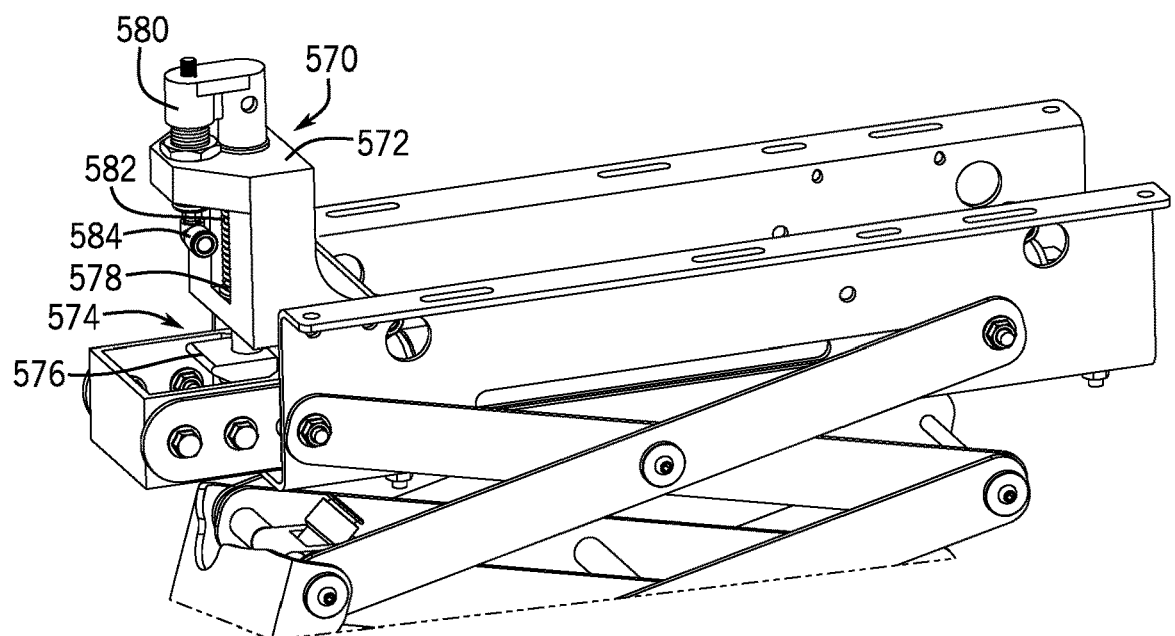

FIGS. 7 and 8 are top isometric views of drop apparatus 170 removed from the boom assembly 130 and particularly depict the top bracket 200 that couples the linkage assembly 300 to the boom assembly 130. The top bracket 200 may have any suitable arrangement. In the depicted examples, the top bracket 200 is generally U-shaped with outwardly extending mounting flanges 202, 204 that enable the mounting of the bracket 200 to the underside of the boom assembly 130. The side walls 210, 220 of the top bracket 200 form an interior portion that at least partially houses the actuation device 500. In one example, the top ends 324a; 334a of one of the scissor links 324, 334 from each pair 320, 330 of the top pair set 310 is mounted to the outer surface of each side 210, 220 in a stationary manner. The other top ends 322a, 332a are secured to the actuation device 500 through slots 212, 222 formed in each side 210, 220 to enable movement of the top ends 322a, 332a relative to the top bracket 200 and the corresponding stationary top ends 324a, 334a, which functions to extend and retract the linkage assembly 300 as described below.

FIGS. 7 and 8 also depict actuation device 500 that functions to drive the extension and retraction of the linkage assembly 300. In one example, the actuation device 500 is a linear actuator device, particularly a pneumatic linear actuator device, although other actuation mechanisms may be provided. In one example, the actuation device 500 includes a cylindrical housing 510 in which a piston rod 520 is partially arranged. The housing 510 may receive air from a source in either of two ports 512, 514. The first end (not shown) of the piston rod 520 is positioned between the two ports 512, 514 within the housing 510. Introduction of air into the ports 512, 514 respectively applies a pressure force to one side of the first end or the other side of the first end to reposition the rod 520. For example, supplying air into port 512 repositions the rod to the right in FIG. 7, such that the rod 520 extends further out of the housing 510; and supplying air into port 514 repositions the rod to the left in FIG. 7, such that the rod 520 extends further into the housing 510.

The other end 524 of the piston rod 520 is coupled to a slide assembly 530 that forms at least a portion of the actuation device 500. The slide assembly 530 is formed by two extended bracket elements 540, 550 joined by a cross-member 532. Each bracket element 540, 550 is considered to include first and second ends 542, 544; 552, 554 and a slot 546, 556.

The first ends 542, 552 of the bracket elements 540, 550 are fastened to the ends 322a, 332a of the linkage assembly 300 through the slots 212, 222 of the top bracket side walls 210, 220. The second ends 544, 554 are fastened to the cross-member 532, which in turn is fastened to the end 524 of the piston rod 520.

As such, when the rod 520 is extended (e.g., due to pressurizing the housing 510 in port 512), the slide assembly 530 pulls the ends 322a, 332a of the linkage assembly 300 toward the corresponding stationary ends 324a, 334a of the linkage assembly 300 that are fixed to the top bracket 200, thereby elongating the vertical dimension of the linkage assembly 300. Conversely, as the rod 520 is retracted (e.g., due to pressurizing the housing 510 in port 514), the slide assembly 530 pulls the ends 322a, 332a away from the cooperating stationary ends 324a, 334a to retract the linkage assembly 300.

The slots 546, 556 in the bracket elements 540, 550 may function to guide or maintain alignment. Guide elements 562, 564 may extend from the interior surface of the top bracket side walls 210, 220 through the slots 546, 556 in the bracket elements 540, 550 to provide support and/or alignment to the slide assembly 530 as it is extended and retracted.

In some examples, the actuation device 500 may be provided with a lock arrangement 570 (as shown in FIG. 8 and omitted in FIG. 7) that functions to maintain the linkage assembly 300 in the retracted position, even when the actuation device 500 loses air pressure. As best shown in FIG. 8, the lock arrangement 570 is generally positioned on the top bracket 200 proximate to the piston rod 520 of the actuation device 500.

In one example, the lock arrangement 570 includes a lock body 572 mounted on the top bracket 200 proximate to the end 524 of the piston rod 520 and cross-member 532 in between the bracket elements 540, 550 of the slide assembly 530. The lock body 572 supports a blocking device 574 that is formed by blocking flange 576 and a device rod 578 extending from the blocking flange 576. As shown, the blocking flange 576 is movably arranged underneath the lock body 572, as described in greater detail below. The device rod 578 extends from the blocking flange 576 through the lock body 572 and into a conduit housing 580. A spring 582 is arranged on the device rod 578 with one end arranged on a stationary structure, such as the lock body 572, and the other end engaging the blocking flange 576. As a result of this arrangement, the spring 582 functions to bias the blocking flange 576 downward, as also discussed in greater detail below.

The conduit housing 580 receives the end of the device rod 578 within interior walls to form a piston arrangement. The conduit housing 580 further includes an air inlet 584 configured to receive air. The conduit housing 580 is configured to direct air received at the air inlet 584 to the underside of the end of the device rod 578 such that the pressure from the air urges the blocking device 574 in an upward direction.

As such, when the lock arrangement 570 is not pressurized (e.g., air is not being supplied to the inlet 584), the spring 582 biases the blocking device 574 downward into a locked position. When is lock arrangement 570 is pressurized (e.g., air is supplied and/or maintained to the inlet 584), the air pressure within the conduit housing 580 overcomes the force of the spring 582 and urges the blocking device 574 upwards into an unlocked position.

In the locked position, the blocking flange 576 of the blocking device 574 is positioned within the path of the slide assembly 530 to prevent extension of the piston rod 520 of the actuation device 500, and thus, preventing repositioning of the linkage assembly 300 from the retracted position to the extended position. In one embodiment, the blocking flange 576 is positioned in front of cross-member 532 in the locked position to prevent further extension, although other arrangements are possible.

In the unlocked position, the blocking flange 576 is removed from the path of the slide assembly 530 to enable extension of the piston rod 520 of the actuation device 500, thereby also enabling the repositioning of the linkage assembly 300 from the retracted position to the extended position.

As noted above, the air inlet 584 in the conduit housing 580 is provided air by an air source. In one example, the air source for the lock arrangement 570 is the same air source as the air source that provides air to the housing 510 of the actuation device 500. In particular, the housings 510, 580 may be on the same air circuit to jointly receive air in concert.

In this arrangement, when air is being supplied to housing 510 of the actuation device 500, air is also being supplied to conduit housing 580 and the lock arrangement 570 is maintained in the unlocked position. However, when air is not being supplied to housing 510 of the actuation device 500, air is also not supplied to conduit housing 580, and thus, the spring 582 of the lock arrangement 570 urges the blocking flange 576 into the locked position. This function may be particularly useful to maintain the drop apparatuses 170 in the retracted position when parked or within storage when the lines to actuation devices 500 may lose air pressure, thereby preventing the linkage assemblies 300 from sagging or inadvertently extending.

Figure 9:
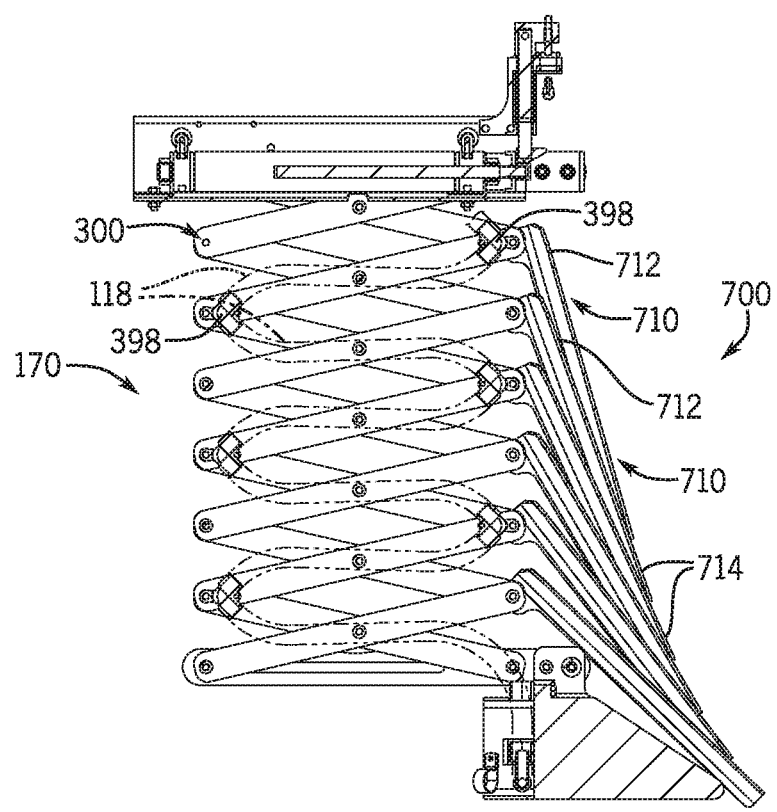

As introduced above, sprayer system 110 operates to direct fluid from the tank 112, through the plumbing 114, and to the spray device 120; and the plumbing 114 may include supply conduits 116 across each of the boom sections 132, 134 and hoses from the supply conduit 116 to each spray device 120. FIG. 9 is a cross-sectional view of the drop apparatus 170 and particularly depicts an interior surface of one side of the linkage assembly 300 that supports the hoses 118 (shown in dashed lines) through the linkage assembly 300. As shown, the linkage assembly 300 may include elbow couplings 398 on alternating positions at the end pivot connections between links. Portions of the fluid hose 118 may extend between the elbow couplings 398 to complete the fluid circuit between the supply conduit 116 and the spray device 120. This arrangement maintains the position of the fluid hose 118 through the linkage assembly 300 in a manner that prevents and/or mitigates tangles, blockages, and/or breakages.

Figure 10:
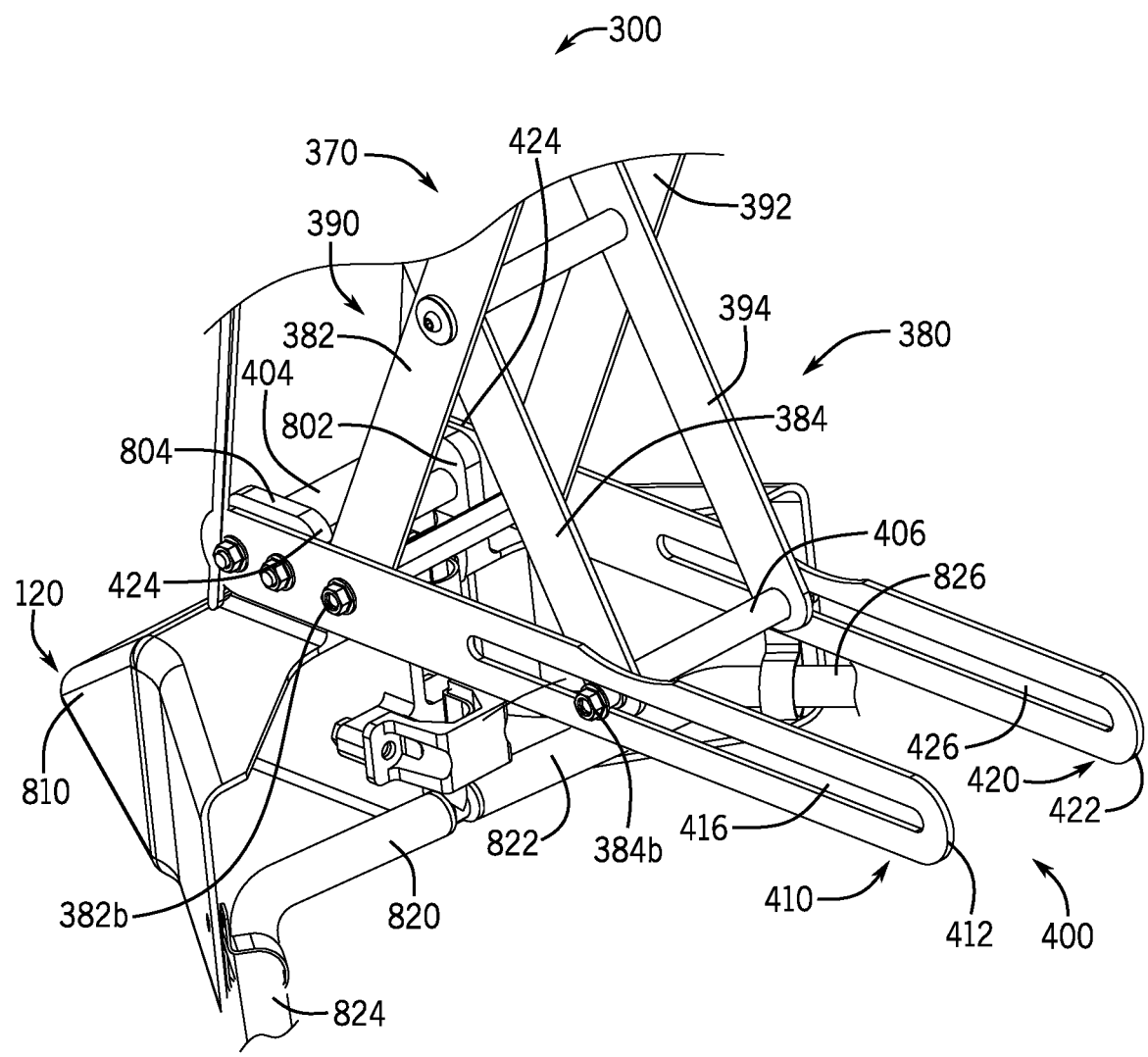

FIG. 10 is a partial bottom isometric view of the drop apparatus 170 and particularly depicts the bottom bracket 400. The bottom bracket 400 functions to couple the linkage assembly 300 to the spray device 120 and is formed by first and second bracket elements 410, 420. Each of the first and second bracket elements 410, 420 has first and second ends 412, 414; 422, 424. The second ends 414, 424 are fixed to mounting flanges 802, 804 of the boom assembly 130 with cross-bar fasteners 402, 404. One end 382*b*, 392*b* of one scissor link 382, 392 of each pair 380, 390 of the bottom pair set 370 is mounted proximate to the second end 414, 424 of the bracket elements 410, 420 in a fixed arrangement.

The bracket elements 410, 420 further define slots 416, 426 that extend at least partially along the lengths, including to the first ends 412, 422. A cross-member 406 extends between the other ends 384*b*, 394*b* of one of the scissor links 384, 394 of the bottom pair set 370 and engages the two slots 416, 426. In this arrangement, as the linkage assembly 300 is extended and retracted as described above, the ends 384*b*, 394*b* slide accordingly within the slots 416, 426 to maintain alignment.

The spray device 120 may take any suitable form. In one example, the spray device 120 includes a guide element 810 with a forward nacelle that expands from front to rear relative to the direction of travel. The flanges 802, 804, mentioned above, extend from the top and rear portion of the guide element 810. A fluid conduit 820 is secured to the guide element 810 with one or more clamps. The fluid conduit 820 includes a common inlet 822 that extends to at least two branches 824, 826 that trail behind the guide element 810. The two branches 824, 826 are appropriately sized and angled to deliver fluid from the sprayer system 110 to the designated location.

The hose 118 (FIG. 9) extending through the linkage assembly 300 is fluidly coupled to the inlet port 822. As such, fluid supplied by the hose 118 (FIG. 9) may be directed through the fluid conduit 820 and out of the branches 824, 826 to two adjacent rows of crops, as an example.

Returning to FIG. 9, the drop apparatus 170 may further include a shield arrangement 700. In one example, the shield arrangement 700 may be formed by a number of cover elements 710. Each cover element 710 may have an elongated shape with upper and lower ends 712, 714. The upper end 712 of each cover element 710 is mounted to the leading edge of the linkage assembly 300, particularly at the end pivot connections between link ends on the leading edge of the linkage assembly 300. Each cover element 710 may be mounted to be at least partially pivotable relative to the respective mounting position on the linkage assembly 300.

In the retracted position, such as shown in FIG. 9, each cover element 710 extends downward from the mounting position to overlap one or more of the lower cover elements 710. Collectively, overlapping cover elements 710 may be "scalloped" in the retracted position.

As the linkage assembly 300 is extended, the cover elements 710 may slide over one another into positions that are less overlapping, although typically, the cover elements 710 may still overlap to some extent. Generally, the cover elements 710 have a length such that the lower end 714 of a respective cover element 710 reaches the upper end 712 of an adjacent, underlying cover element 710 when the linkage assembly 300 is in the extended position.

An example of the shield arrangement 700 in the extended position of the linkage assembly 300 is depicted in FIGS. 5 and 6. As shown, the cover elements 710 of the shield arrangement 700 collectively form a relatively unbroken or generally continuous surface to protect the linkage assembly 300 from debris and moisture in the extended position.

As introduced above, the boom assembly 130 may include folding arrangements 136, and in one embodiment, the retractable drop apparatuses 170 may cooperate with the folding arrangements 136 in order to facilitate compact and efficient storage and transport. As examples, FIG. 11 is a partial top view of the work machine 100, and FIGS. 12 and 13 are partial side and isometric views of the work machine 100.

Figure 11:
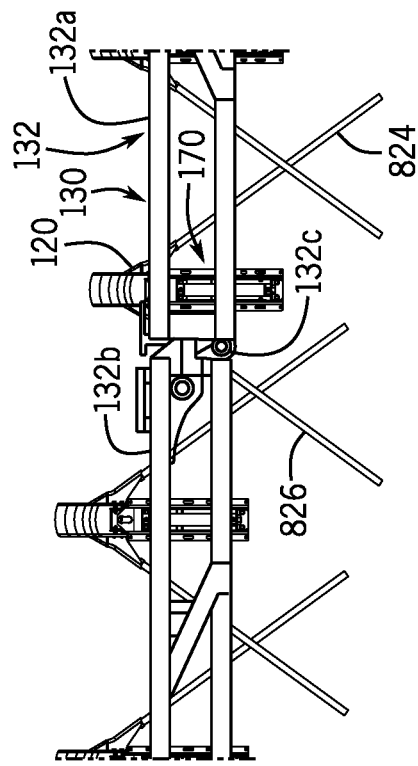

Reference is initially made to FIG. 11, which depicts a partial top view of the boom assembly 130, particularly portions of inner section 132*a* and outer section 132*b* joined at hinge 132*c*. Portions of the drop apparatuses 170 and spray devices 120 are also depicted in FIG. 11. In the depicted example of FIG. 11, the folding arrangement 136 is formed by the hinge 132*c*, which is arranged such that the outer section 132*b* may be pivoted counterclockwise. Although not shown, actuation devices may be provided to drive the folding of the outer section 132*b*, while in other embodiments, the outer section 132*b* may be manually folded. Locking or securement devices may further be provided to maintain the outer section 132*b* in the unfolded or extended position and/or in the folded position.

Figure 13:
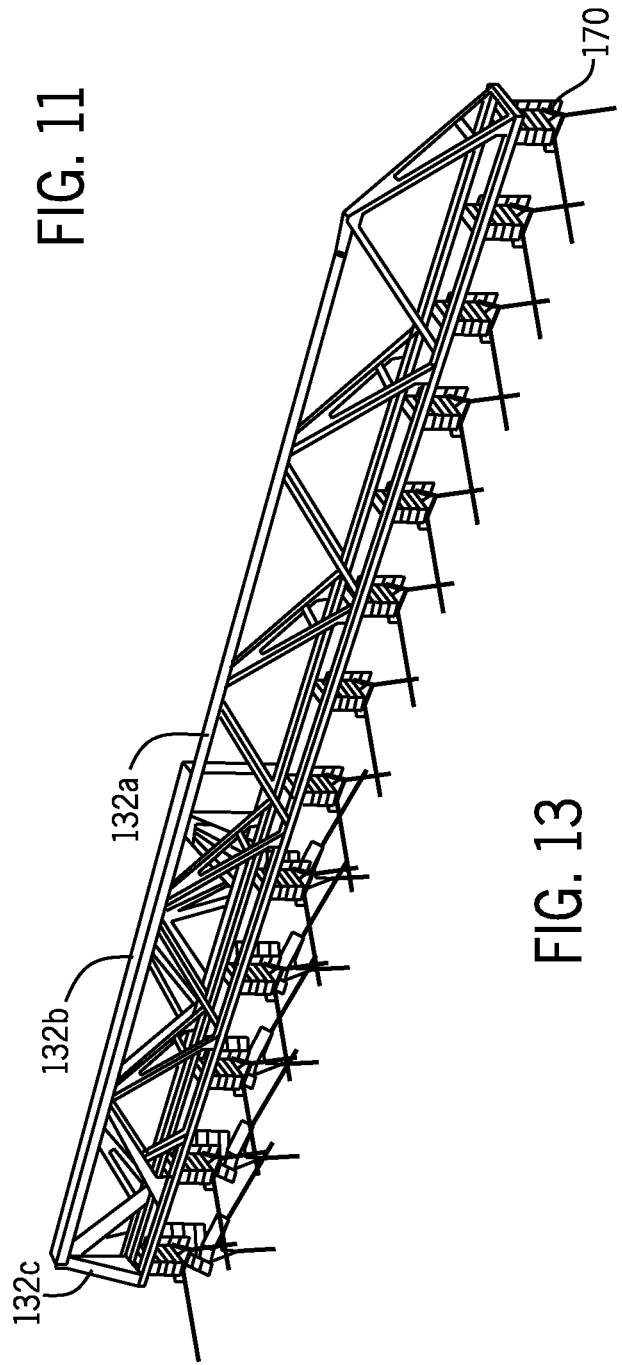
Figure 12:
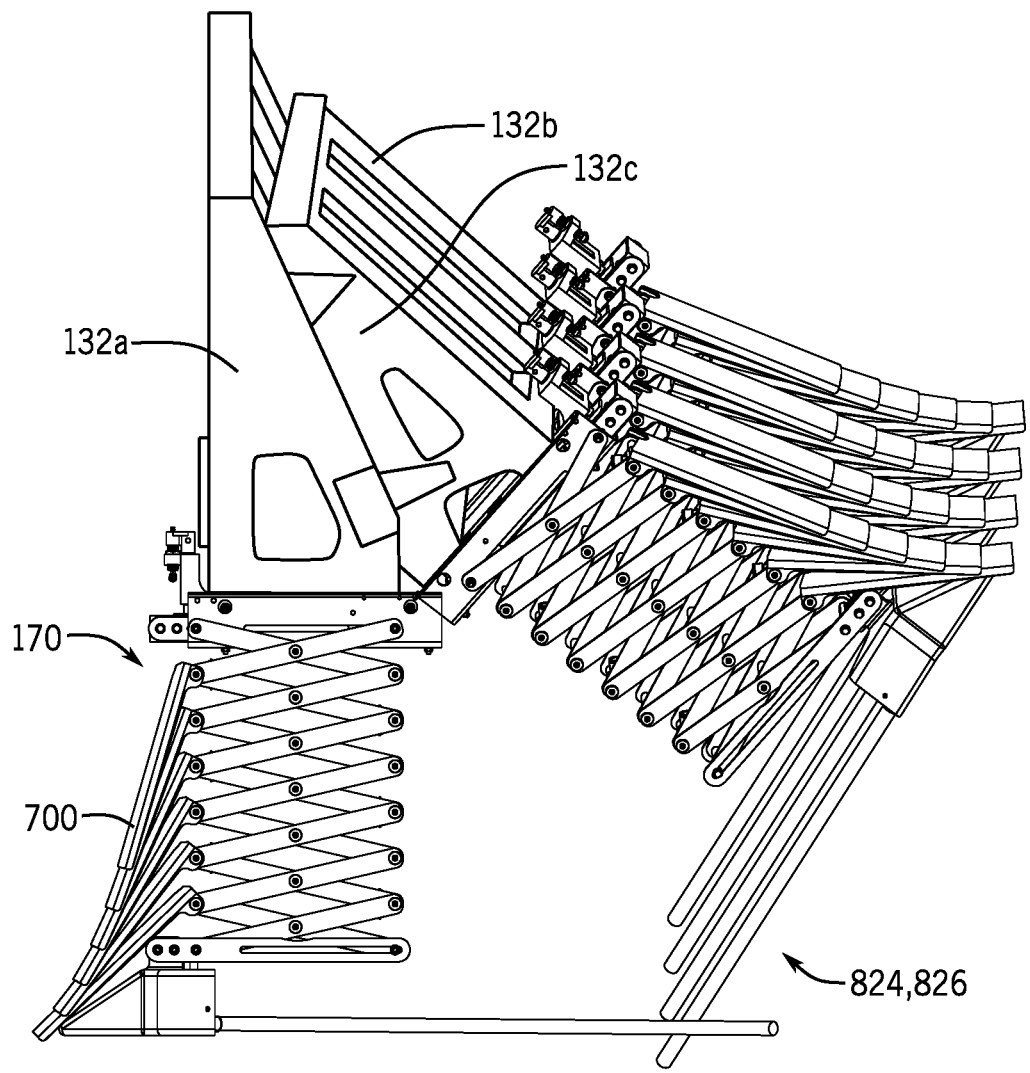

FIGS. 12 and 13 are views of the boom sections 132*a*, 132*b* in the folded position. As shown, the drop apparatuses 170 are retracted during the folding operation to provide a relatively compact arrangement. In this position, the branches 824, 826 of the spray devices 120 may be interlaced one another to generally prevent or mitigate tangles or damage.

In one example, the retraction and extension of the drop apparatuses 170 may be automatically managed by the controller 150. In other examples, the actuation may be initiated by the operator in the cab, and/or in other examples, an operator may manually reposition the drop apparatuses 170 without the benefit of actuation devices 500. The drop apparatuses 170 may be actuated individually, in groups, or as a whole.

In one embodiment, the controller 150 may actuate the drop apparatuses 170 as part of the overall operation of the machine 100. As an example of such operation, the controller 150 may determine when the machine 100 is nearing the end of a set of rows, such as indicated by distance traveled or location sensors. Upon reaching the end of the rows, the controller 150 may send a signal to one or more of the actuation devices 500 to retract the corresponding drop apparatuses 170 to prevent and/or mitigate damage to the crops at the end of the rows as the machine 100 turns to begin fluid application on an adjacent set of rows. As noted above, some or all of the drop apparatuses 170 may be retracted, as determined by the controller 150 or according to a preprogrammed plan. When the machine 100 is in the proper position, the controller 150 may send a signal to the actuation devices 500 of the retracted drop apparatus 170 to return to the extended positions for continued application of fluid.

In some embodiments, the controller 150 may further actuate the drop apparatuses 170 in cooperation with the folding arrangements 136. For example, upon encountering an obstacle on one side or a more narrow section of rows for which one or both of the booms 132, 134 are too wide, the controller 150 may identify the boom section 132*b*, 134*b* to be folded, retract the drop apparatuses 170 for that section 132*b*, 134*b*, and then initiate the folding operation in a more compact arrangement.

In some instances, the sprayer system described above may be implemented as a method for applying fluids to agricultural crops. As an example, in a first step, the sprayer system may receive an initiation signal from an operator in the cab or other source, such as a remote command. In response, the sprayer system may initiate operation, which may include preparing machine systems, fluids in the sprayer system, downloading programs or plans, and the like. The sprayer system may then travel to the designated area for fluid application. Upon arrival, the booms may be unfolded (if stored in the folded position), and subsequently, the drop apparatuses may be extended (if stored in retracted positions). At this point, the sprayer system may begin operation by driving down the designated set of rows and applying fluids from the storage tank via the plumbing and spray devices. As necessary, such as when turning, the sprayer system may retract and extend the drop apparatuses and fold and unfold the boom assembly. Upon completion of the task, the sprayer system may retract the drop apparatuses, fold the boom assembly, maneuver into a storage position, and shut down.

Accordingly, the examples discussed above provide systems and methods with drop apparatuses, each having a linkage assembly that retracts and extends primarily along an upright reference (or vertical) axis, as opposed to drop apparatuses that do not retract and/or pivoting drop assemblies that pivot about a horizontal axis. This enables more versatile sprayer system and/or a work machine with more compact dimension without adding undue weight and/or complexity.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A sprayer system of a work vehicle with a boom a fluid source, comprising:
   a spray head configured to selectively apply a fluid from the fluid source on the work vehicle to an agricultural crop;
   a drop apparatus comprising a scissor linkage assembly with a top portion coupled to the boom and a bottom portion coupled to the spray head, the scissor linkage assembly having a plurality of scissor link pairs, each of the scissor link pairs formed by first and second scissor links having top and bottom ends and interconnected to one another at intermediate points between the top and bottom ends, the plurality of scissor link pairs including a first scissor link pair;
   an actuator having a piston rod movable by air pressure to drive the plurality of scissor link pairs between the retracted position and the extended position to raise and lower the spray head relative to the boom along an upright reference axis, the actuator driving the top end of the second scissor link of the first scissor link pair towards the top end of the first scissor link of the first scissor link pair to reposition the scissor linkage assembly into the extended position and to drive the top end of the second scissor link of the first scissor link pair away from the top end of the first scissor link of the first scissor link pair to reposition the scissor linkage assembly into the retracted position;
   a hose configured to fluidly couple the spray head to the fluid source; and
   a plurality of hose elbows arranged on the scissor linkage assembly to route the hose from the boom to the spray head.

2. A sprayer system of a work vehicle with a boom and a fluid source, comprising:
   a spray head configured to selectively apply a fluid from the fluid source on the work vehicle to an agricultural crop;
   a drop apparatus comprising a scissor linkage assembly with a top portion coupled to the boom and a bottom portion coupled to the spray head, the scissor linkage assembly being selectively repositionable between a retracted position and an extended position to raise and lower the spray head relative to the boom along an upright reference axis; and
   a cover arrangement that includes a plurality of cover elements arranged on a leading edge of the scissor linkage assembly such that, when the scissor linkage assembly is in the retracted position, the cover elements overlap one another along the upright axis and, when the scissor linkage assembly is in the extended position, the cover elements collectively form a substantially unbroken surface along the upright axis at at least a portion of the leading edge of the scissor linkage assembly.

3. An agricultural work machine, comprising:
   a chassis;
   an engine mounted on the chassis for propelling the work machine;
   a boom extending from at least one side of the chassis; and
   a sprayer system comprising:
      a tank coupled to the chassis;
      a spray head configured to selectively apply a fluid from the tank to an agricultural crop;
      a drop apparatus comprising a scissor linkage assembly with a top portion coupled to the boom and a bottom portion coupled to the spray head, the scissor linkage assembly having a plurality of scissor link pairs, each of the scissor link pairs formed by first and second scissor links having top and bottom ends and interconnected to one another at intermediate points between the top and bottom ends, the plurality of scissor link pairs including a first scissor link pair; and
      an actuator having a piston rod movable by air pressure to drive the plurality of scissor link pairs between the retracted position and the extended position to raise and lower the spray head relative to the boom along an upright reference axis, the actuator driving the top end of the second scissor link of the first scissor link pair towards the top end of the first scissor link of the first scissor link pair to reposition the scissor linkage assembly into the extended position and to drive the top end of the second scissor link of the first scissor link pair away from the top end of the first scissor link of the first scissor link pair to reposition the scissor linkage assembly into the retracted position, the actuator having a lock arrangement that prevents extension of the piston rod upon loss of the air pressure.

4. The agricultural work machine of claim 3, wherein the drop apparatus further comprises a top bracket coupling the top portion of the scissor linkage assembly to the boom, and wherein the actuator is at least partially housed within the top bracket.

5. The agricultural work machine of claim 4, wherein the top end of the first scissor link in the first scissor link pair is fixed to the top bracket and the top end of the second scissor link in the first scissor link pair is coupled to the actuator.

6. The agricultural work machine of claim 5, wherein the top bracket includes first side wall defining a first slot, and wherein the actuator is coupled to the top end of the second scissor link of the first scissor link pair through the first slot.

7. The agricultural work machine of claim 5, wherein the actuator is a linear actuator and the piston rod has a first end movably arranged within an actuator housing and a second end coupled to the top end of the second scissor link.

8. The agricultural work machine of claim 3, wherein the lock arrangement includes a blocking flange proximate the piston rod; and
wherein the blocking flange is responsive to pressure to reposition relative to the piston rod.

9. The agricultural work machine of claim 8, wherein the lock arrangement further comprises a spring that biases the blocking flange in a position to block a path of the piston rod in the absence of pressure to the locking arrangement;
wherein, when pressure is supplied to the locking arrangement sufficient to overcome the spring, the blocking flange is positioned out of the path of the piston rod.

10. The agricultural work machine of claim 3, further comprising:
a hose configured to fluidly couple the spray head to the tank; and
a plurality of hose elbows arranged on the scissor linkage assembly to route the hose from the boom to the spray head.

11. The agricultural work machine of claim 3, further including:
a cover arrangement that includes a plurality of cover elements arranged on a leading edge of the scissor linkage assembly such that, when the scissor linkage assembly is in the retracted position, the cover elements overlap one another along the upright axis and, when the scissor linkage assembly is in the extended position, the cover elements collectively form a substantially unbroken surface along the upright axis at at least a portion of the leading edge of the scissor linkage assembly.

12. An agricultural work machine, comprising: a chassis; a boom extending from at least one side of the chassis; and a sprayer system comprising:
a tank coupled to the chassis;
a spray head configured to selectively apply a fluid from the tank to an agricultural crop;
a drop apparatus comprising a scissor linkage assembly with a top portion coupled to the boom and a bottom portion coupled to the spray head, the scissor linkage assembly having a plurality of scissor link pairs, each of the scissor link pairs formed by first and second scissor links having top and bottom ends and interconnected to one another at intermediate points between the top and bottom ends, the plurality of scissor link pairs including a first scissor link pair; and
an actuator having a piston rod movable by air pressure to drive the plurality of scissor link pairs between the retracted position and the extended position to raise and lower the spray head relative to the boom along an upright reference axis, the actuator driving the top end of the second scissor link of the first scissor link pair towards the top end of the first scissor link of the first scissor link pair to reposition the scissor linkage assembly into the extended position and to drive the top end of the second scissor link of the first scissor link pair away from the top end of the first scissor link of the first scissor link pair to reposition the scissor linkage assembly into the retracted position and the actuator has a lock arrangement that prevents extension of the piston rod upon loss of the air pressure.

13. The agricultural work machine of claim 12, wherein the drop apparatus further comprises a top bracket coupling the top portion of the scissor linkage assembly to the boom, and wherein the actuator is at least partially housed within the top bracket.

14. The agricultural work machine of claim 13, wherein the top end of the first scissor link in the first scissor link pair is fixed to the top bracket and the top end of the second scissor link in the first scissor link pair is coupled to the actuator.

15. The agricultural work machine of claim 14, wherein the top bracket includes first side wall defining a first slot, and wherein the actuator is coupled to the top end of the second scissor link of the first scissor link pair through the first slot.

16. The agricultural work machine of claim 14, wherein the actuator is a linear actuator and the piston rod has a first end movably arranged within an actuator housing and a second end coupled to the top end of the second scissor link.

17. The agricultural work machine of claim 12,
wherein the lock arrangement includes a blocking flange proximate the piston rod; and
wherein the blocking flange is responsive to pressure to reposition relative to the piston rod.

18. The agricultural work machine of claim 17, wherein the lock arrangement further comprises a spring that biases the blocking flange in a position to block a path of the piston rod in the absence of pressure to the locking arrangement;
wherein, when pressure is supplied to the locking arrangement sufficient to overcome the spring, the blocking flange is positioned out of the path of the piston rod.

19. The agricultural work machine of claim 12, further comprising:
a hose configured to fluidly couple the spray head to the tank; and
a plurality of hose elbows arranged on the scissor linkage assembly to route the hose from the boom to the spray head.

20. The agricultural work machine of claim 12, further including:
a cover arrangement that includes a plurality of cover elements arranged on a leading edge of the scissor linkage assembly such that, when the scissor linkage assembly is in the retracted position, the cover elements overlap one another along the upright axis and, when the scissor linkage assembly is in the extended position, the cover elements collectively form a substantially unbroken surface along the upright axis at at least a portion of the leading edge of the scissor linkage assembly.

\* \* \* \* \*